March 3, 1936.  T. W. MURPHY  2,032,885
LIQUID PRESSURE CONTROL UNIT
Filed Feb. 20, 1935  4 Sheets-Sheet 1
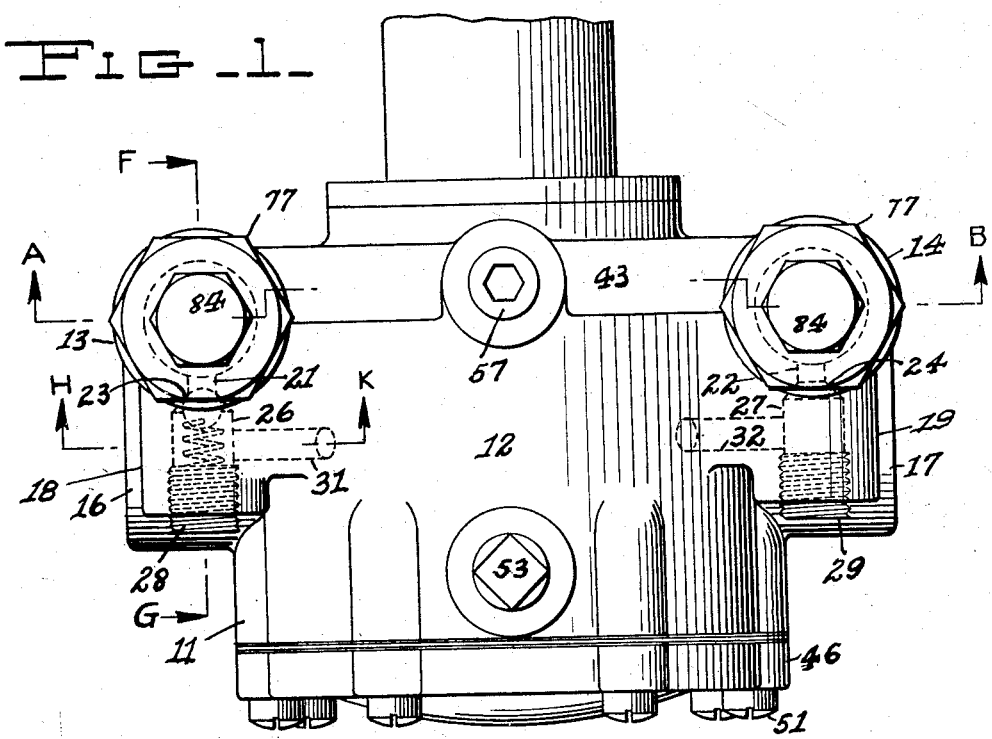
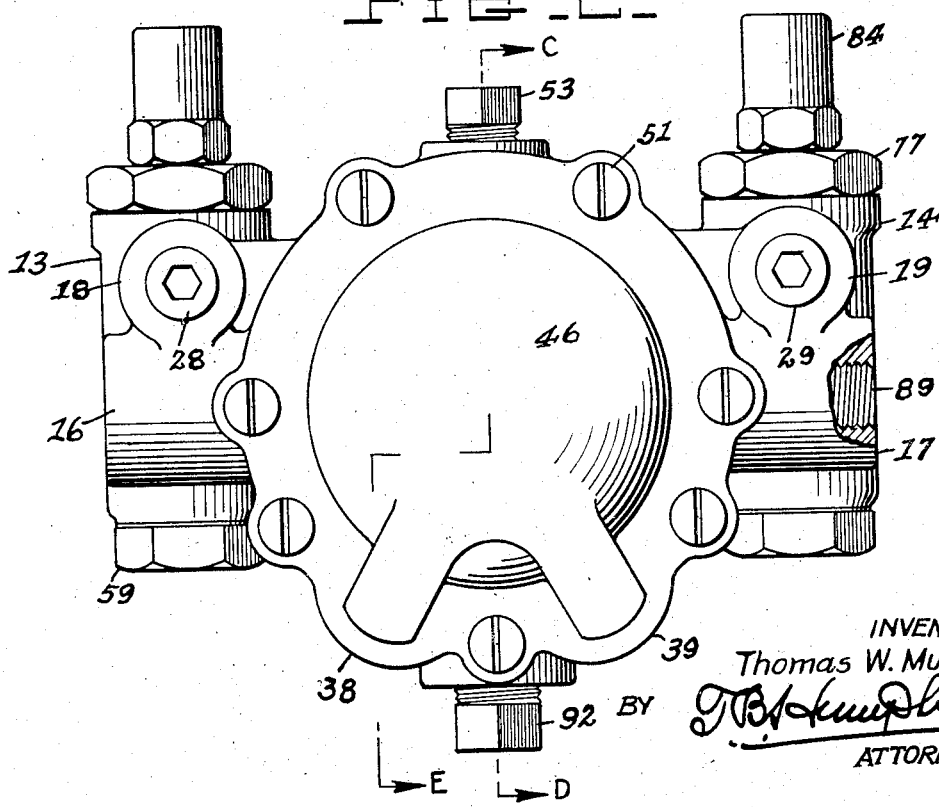
INVENTOR
Thomas W. Murphy
BY
ATTORNEY March 3, 1936.   T. W. MURPHY   2,032,885
LIQUID PRESSURE CONTROL UNIT
Filed Feb. 20, 1935   4 Sheets-Sheet 2
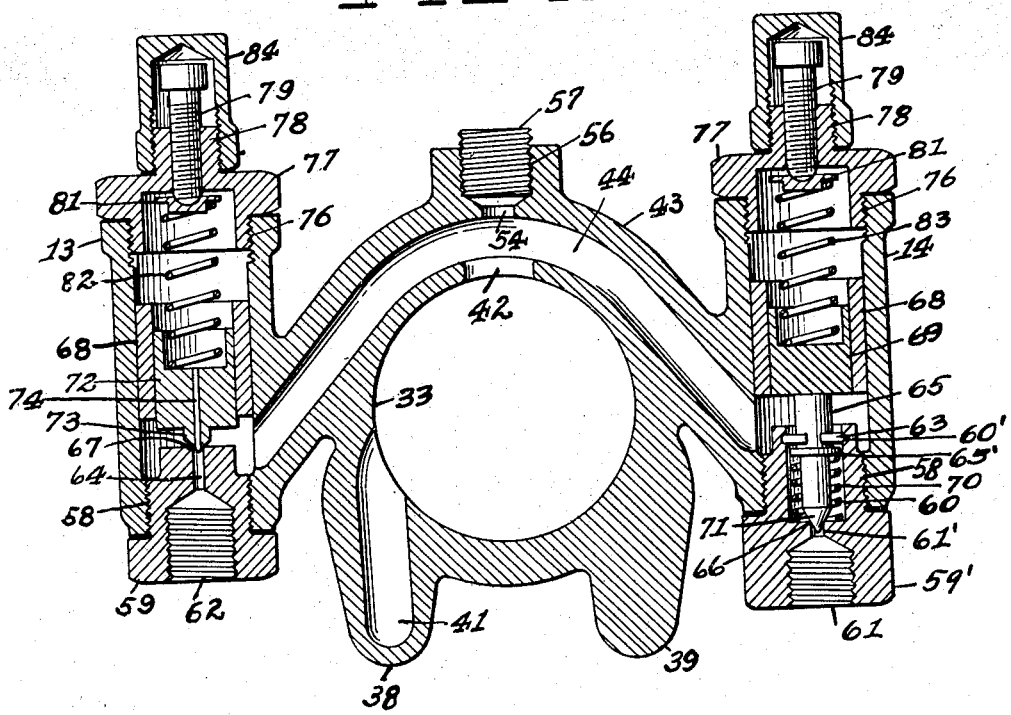
FIG-3-
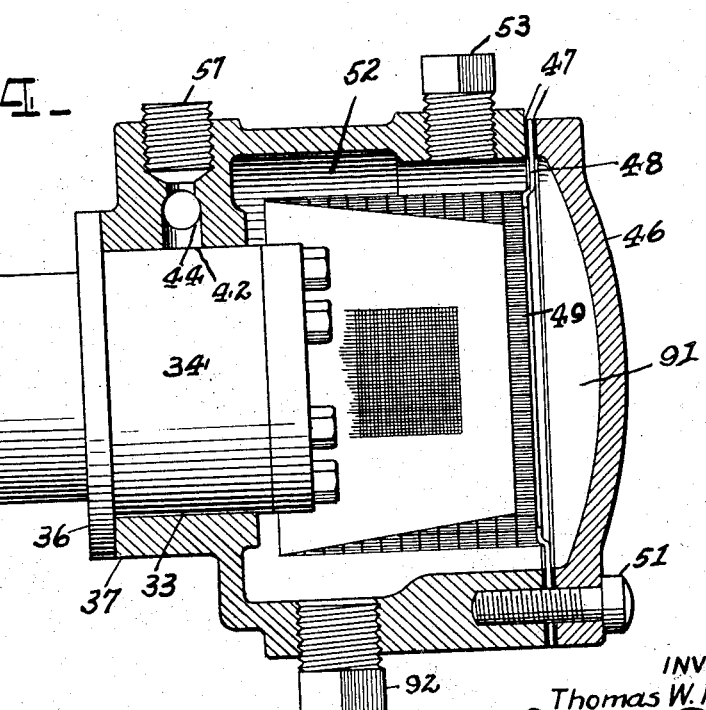
FIG-4-
INVENTOR
Thomas W. Murphy
BY
ATTORNEY March 3, 1936.  T. W. MURPHY  2,032,885
LIQUID PRESSURE CONTROL UNIT
Filed Feb. 20, 1935  4 Sheets-Sheet 3
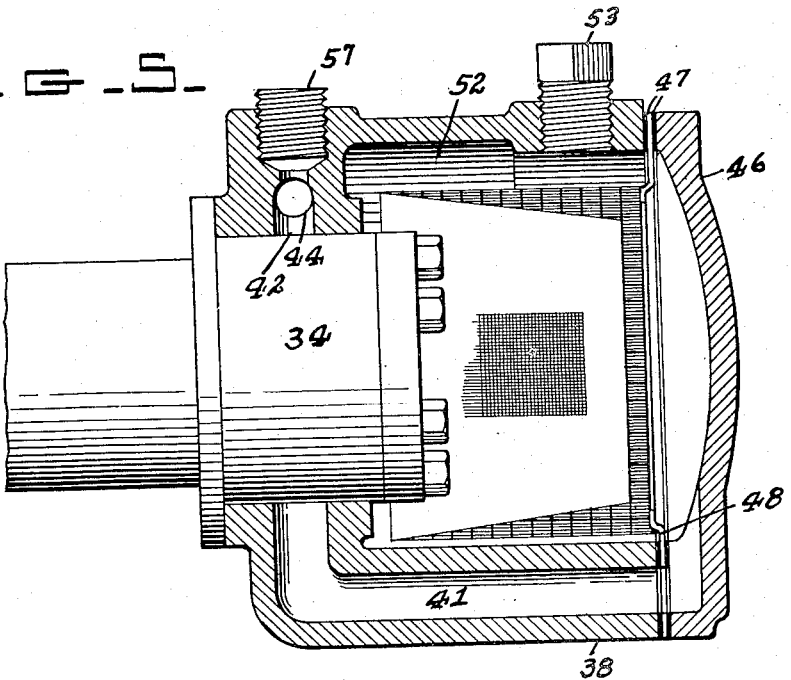
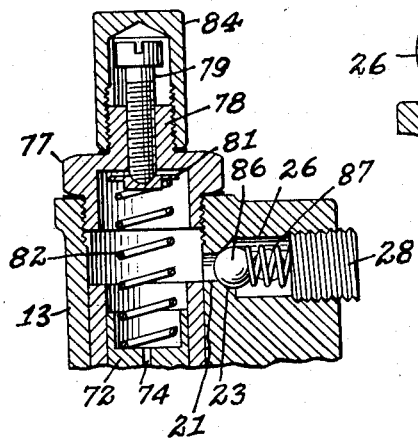
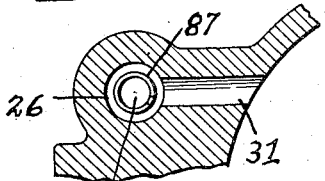
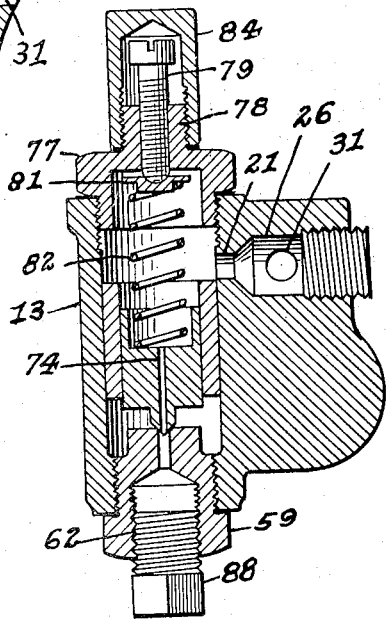
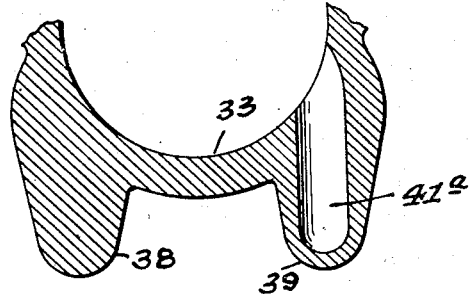
INVENTOR
Thomas W. Murphy
BY
ATTORNEY March 3, 1936.  T. W. MURPHY  2,032,885
LIQUID PRESSURE CONTROL UNIT
Filed Feb. 20, 1935  4 Sheets-Sheet 4
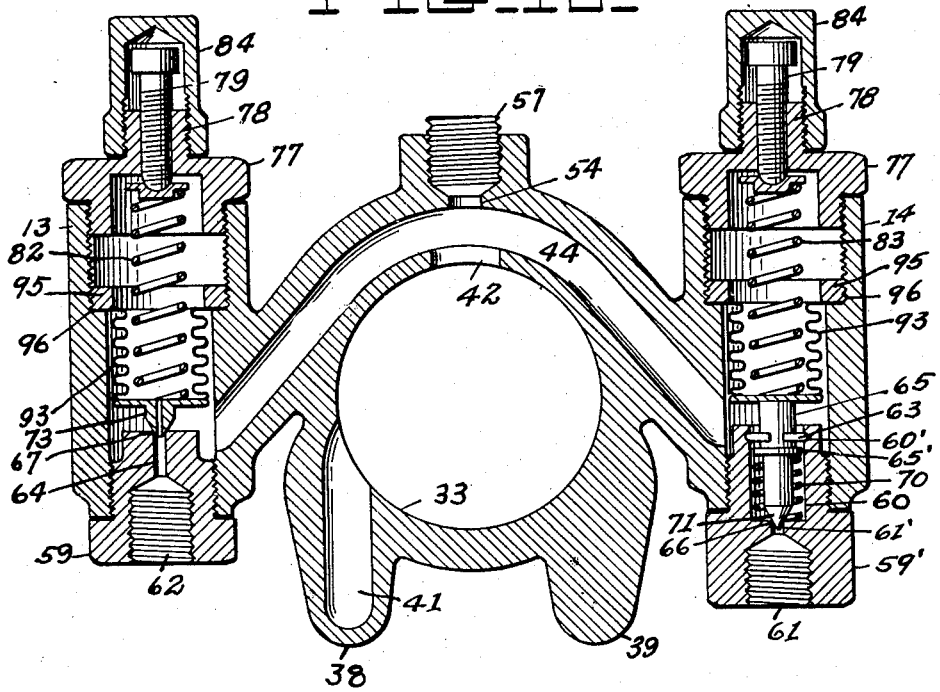
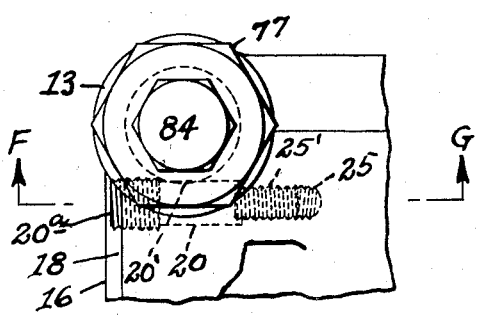
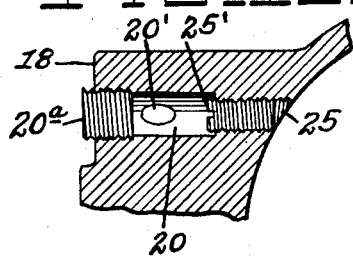
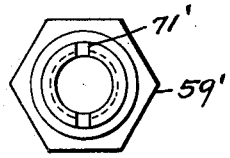
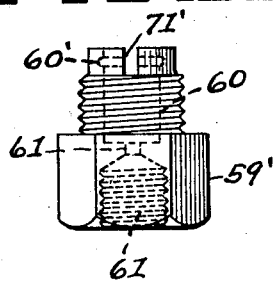
INVENTOR
Thomas W. Murphy
BY
ATTORNEY Patented Mar. 3, 1936

2,032,885

UNITED STATES PATENT OFFICE 2,032,885

LIQUID PRESSURE CONTROL UNIT

Thomas W. Murphy, Bala-Cynwyd, Pa., assignor to Monarch Manufacturing Works, Inc., Philadelphia, Pa., a corporation of Delaware Application February 20, 1935, Serial No. 7,317

9 Claims. (Cl. 103—42)

This invention relates to a liquid pressure control unit, and particularly to the type wherein the liquid is first filtered, then raised to the required pressure, and then when a predetermined pressure is attained, passed to the element for which it is intended, while the excess liquid is either returned to the source of supply or to the vacuum side of the pressure device. The unit, therefore, has a filter, a pump, a regulating valve, and a by-pass valve all housed in a unitary casing. In the present instance the device will be explained as a pressure control apparatus for use with the usual oil burner, but its functions are not intended to be limited thereby.

An object of the invention is to provide a unitary casing housing all the necessary elements for oil burner control.

A second object is to provide such an apparatus wherein the regulating or burner flow valve and excess by-pass valves are on opposite sides of the casing and in which the operating parts are interchangeable, thereby permitting these valves to be at the desired sides of the casing without any casing change.

Another object of the invention is to provide for the optional flow of excess liquid either to the source of supply or to the vacuum side of the pump.

Another object is to provide a unit having few parts which may be readily assembled, and which, when adjusted, are unlikely to become faulty in operation.

According to the invention the liquid pressure control unit comprises a single casing having an inlet, a vacuum chamber into which liquid is drawn by the action of a pump extending into said casing, a filter basket through which the liquid must pass before entering the pump, a pressure outlet from the pump divided so that its branches extend to opposite sides of said casing and into valve chambers, valves in said chambers, one of said valves being arranged to open at a predetermined pressure to permit liquid to be delivered therefrom, and the other valve being designed to open when a certain predetermined higher pressure is attained to by-pass the excess liquid either to the source of supply or to the vacuum side of the pump. The valve chambers are identical so that the delivery valve and excess by-pass valve may be disposed on either side of the casing as desired.

The drawings illustrate an embodiment of the invention and the views therein are as follows:

Fig. 1 is a top plan view of the unit, showing a part of the pump broken away.

Fig. 2 is a front elevation of the same.

Fig. 3 is a cross sectional view taken on the line A—B of Fig. 1.

Fig. 4 is a vertical sectional view taken on the line C—D of Fig. 2.

Fig. 5 is an offset vertical sectional view taken on the line C—E of Fig. 2.

Fig. 6 is a partial vertical sectional view on the line F—G of Fig. 1, and shows the arrangement when excess oil is being returned to the source of supply.

Fig. 7 is a fragmentary vertical sectional view taken on the line H—K of Fig. 1.

Fig. 8 is a vertical sectional view taken on the line F—G of Fig. 1 with the ball and spring omitted and a plug placed in the by-pass passage at the bottom thereof and shows the arrangement when liquid is being returned to the vacuum side of the pump.

Fig. 9 is a fragmentary cross section on the line A—B of Fig. 1 and shows the arrangement of coring when the pump rotation is the reverse of that shown in Fig. 3.

Fig. 10 is a view similar to Fig. 3 and illustrates the use of bellows diaphragms in place of pistons.

Fig. 11 is a fragmentary part of a top plan view and shows another manner of controlling the passage from the upper part of the valve casing to the vacuum chamber.

Fig. 12 is a vertical section on the line F—G of Fig. 11.

Fig. 13 is a top plan view of the unit used in the delivery valve.

Fig. 14 is a side elevation of same.

As illustrated in the drawings, the casing 11 comprises the body 12 with valve sleeves 13 and 14 on the opposite sides of same. Near the bottoms of the valve sleeves are extensions 16 and 17, either of which may be drilled and tapped to receive an inlet pipe (not shown) from the source of liquid supply. This will be later explained.

Above the extensions 16 and 17 and extending out from the valve sleeves are lugs 18 and 19. These lugs have openings 21 and 22 extending in to the interior of the valve sleeves 13 and 14 and are provided with seats 23 and 24, terminating in enlarged bores 26 and 27, the outer ends of which are tapped to receive screw plugs 28 and 29.

The bores 26 and 27 are provided with passageways 31 and 32, communicating with said bores and with the vacuum chamber, as later explained.

The rear of the body has a bore 33 into which a pump 34 is forced, the flange 36 of said pump fitting against the shoulder 37 of said casing. The pump is of any suitable type, and nothing herein is claimed in connection with the pump per se.

In oil burning systems the pump may be rotated either in clockwise or counter-clockwise direction and the casing herein illustrated may be employed in either event with slight modifications hereinafter explained.

Referring now to Fig. 2, the body is provided with ribs 38 and 39 which extend from front to back of said casing and up the rear thereof, as shown in Fig. 3, and one of these ribs is cored out to provide a passageway 41 which communicates at the rear of the casing with the vacuum side of the pump as illustrated in Fig. 5.

The pump discharges through an opening 42 (see Fig. 3) and the rib 43 (see Fig. 1) is cored out to provide the passageway 44 (see Fig. 3) which communicates with each of the valve sleeves 13 and 14 at a point near the bottom of same.

The front of the body 12 has an enclosing plate 46 and with gaskets 47 binds the flange 48 of a filter basket 49 therebetween. These parts are secured in place by means of the bolts 51 shown in Figs. 1 and 2.

The filter basket 49 is substantially circular in shape and its diameter is a little less than the diameter of the vacuum chamber 52.

The vacuum chamber 52 is provided with a plug 53 which may be removed if it is desired to employ a vacuum gauge.

The passageway 44 is provided with an opening 54 leading to a drilled and tapped hole 56 in which a screw plug 57 is inserted and which may be removed for the purpose of inserting a pressure gauge.

As hereinbefore explained, the valve sleeves 13 and 14 are identical, and in the present instance the delivery or regulating valve has been shown at the right hand side and the excess by-pass valve at the left hand side of the casing. Each of these valve sleeves is provided with a machined sleeve 68, which is forced into position and provides a cylinder for a piston.

Referring now to Fig. 3, the bottom of the sleeves 13 and 14 are threaded as at 58 and nuts 59 and 59' are screwed into same. The interior of each sleeve has a larger diameter above the threaded portion 58. The delivery valve sleeve nut 59' is shown in detail in Figs. 13 and 14. This nut has a threaded outlet 61 which leads into a small passage 61' opening into an enlarged chamber 60. Near the top of this chamber the wall thereof is provided with an annular groove 60' for receiving a split ring 63 when the valve stem 65 is in position in the chamber. The valve stem has a collar 65' and a needle point 71, which normally sits in the seat 66. Between the collar 65' and the bottom of the chamber 60 is a spiral lifting spring 70 for raising said valve, as later explained. The top of the nut 59' is smaller than the threaded part thereof and has a wide saw cut 71' across the same to admit liquid to the chamber 60.

The valve sleeve 14 has a piston 69 which normally leans against the top of the valve stem 65 and thus keeps the needle 71 properly seated in the seat 66.

The nut 59 in the bottom of the excess by-pass valve sleeve 13 has a threaded outlet 62 and this outlet leads into a passageway 64 provided at its upper end with a seat 67.

The piston 72 in the valve sleeve 13 is provided with an integral needle valve 73 which extends into the seat 67 and a passageway 74 leads from the apex of this needle valve directly through the piston and communicates with the area above the same.

Each of the valve sleeves is provided with an internal threaded portion 76 at the upper end of the same and into this a nut 77 is threaded. This nut has an externally threaded extension 78 and is provided with a regulating screw 79, which extends through said nut and bears by its lower end on a spring seat 81 on the top of a spiral spring whose bottom end rests on the piston in each of the valves.

The spring in the valve sleeve 13 is characterized by the numeral 82, and that in the other valve sleeve by the numeral 83.

The extension 78 has a cap 84 fitting over the same to prevent maladjustment of the regulating screw and to prevent any seepage of liquid from around said screw.

In Fig. 3 the by-pass opening 62 is shown without a plug and it is intended that a pipe shall be threaded into the same, leading directly to the source of liquid supply. When the valve is thus used, the bore 26 is arranged as shown in Fig. 6, i. e. a ball 86 rests within the seat 23, and a spiral spring 87 engages the same, and the screw plug 28 holds said ball firmly in said seat and prevents the passage of any liquid through the opening 21 and passageway 31, which lead to the vacuum side of the pump.

When, however, it is desired to by-pass liquid to the vacuum side of the pump through opening 21 and passageway 31, the ball 86 and spring 87 are omitted and a screw plug 88 (see Fig. 8) is screwed into the by-pass outlet 62.

The ball and spring may be eliminated by employing the arrangement shown in Figs. 11 and 12, where the lugs 18 and 19 are drilled so that the hole 20 breaks the wall of the valve sleeve to provide an opening 20' for the admission of liquid. Beyond the hole 20 there is a smaller hole 25 drilled into the vacuum chamber, and this hole is tapped. The outer end of the hole 20 is provided with a screw plug 20a while the hole 25 may be provided with a screw plug 25' when it is desired to by-pass the excess liquid to the source of supply, which plug may be omitted when the liquid is to be returned to the vacuum chamber.

As before explained, either of the extensions 16 and 17 on opposite sides of the casing may be drilled and tapped to receive a pipe from the source of liquid supply. In Fig. 2 the extension 17 on the right hand side of the casing is utilized for the inlet port 89 because we will assume that the piping is arranged so as to more conveniently connect with this side of the casing.

The operation of the device with parts arranged as described is as follows: liquid admitted from the inlet opening 89 passes into the vacuum chamber 52 and through the filter basket 49 into the convex inner side 91 of the enclosing plate 46, thence into the passageway 41 which passes along the bottom of the casing and extends up the rear of the same, communicating with the suction side of the pump. It will thus be seen that the liquid entering from the inlet port 89 will always be under vacuum and will therefore be drawn through the wire gauze filter basket to restrain particles of dirt or solid matter from being passed to the pump. From time to time the vacuum chamber may be cleansed to remove the foreign matter by unscrewing the plug 92 in the bottom of the casing.

Liquid under pressure is discharged from the pump through the opening 42 into the passageway 44. This passageway, as will readily be seen from an inspection of Fig. 3, extends into both of the valve sleeves 13 and 14 so that liquid is admitted under the piston 69 in the valve casing 14, and 72 in the valve casing 13.

Let us assume that the regulating screw 79 of the valve sleeve 14 has been so adjusted that the tension exerted by the spiral spring 83 will require 60 pounds pressure to be overcome.

Let us also assume that the regulating screw 79 in the valve sleeve 13 has been so adjusted that it will require 100 pounds pressure to overcome the tension of the spring 82. These pressures are merely arbitrary and are used only for the purpose of explanation.

When the pressure of the liquid under the piston 69 has reached 60 pounds, the tension of the spring 83 being thereby overcome, the said piston 69 will be raised, and the spiral spring 70 will then raise the valve stem 65, withdrawing the needle valve 71 from the seat 66 and permitting the liquid to flow through the passageway 61' and the outlet 61. This outlet in the ordinary oil burner system is connected to the burner nozzle of the furnace.

Any liquid which seeps around the piston 69 will pass above the same and through passageway 32 which connects with the vacuum chamber, so that no pressure can ever be built up by the liquid above the piston.

As the pressure in the passageway 44 continues to increase it exerts pressure beneath the piston 72 in the valve sleeve 13 and when it reaches 100 pounds it overcomes the tension of the spring 82, raising the piston and the needle valve 73 from the seat 67. The operation of this valve will first be explained from Figs. 3, 6 and 7. As the needle valve 73 rises it opens the passageway 64 and allows excess liquid to pass downward through the by-pass outlet 62 back to the source of supply. This outlet 62 is, of course, at approximately atmospheric pressure, so that the passageway 74, extending through the piston 72, will prevent the building up of any liquid pressure above the piston 72. It is also true that when the valve is closed any liquid which seeps past the piston will pass down through the passageway 74 and 64 and through the outlet 62.

When it is desired to omit the pipe from the outlet 62 to the source, the valve is arranged as shown in Fig. 8, or in Figs. 11 and 12 with the plug 25' omitted or withdrawn. The plug 88 closes the by-pass outlet 62 and the ball 68 and spring 87 having been removed, the excess liquid, when the piston 72 is raised, will pass up through the passageway 74, through the opening 21 into the bore 26 and thence through the passageway 31 communicating with the vacuum chamber.

In like manner the plug 25' in Figs. 11 and 12 may be removed and liquid permitted to pass through the opening 20' and the holes 20 and 25.

When inserting the plug 88 (see Fig. 8) in port 62 of the nut 59 (see Figs. 3 and 10) and removing plug 20a (see Figs. 11 and 12), port 20 then becomes the normal by-pass to the source of supply; but when it is desired to return all of the excess liquid pumped into the vacuum chamber, in order to save the cost of the return line to the source and also in order to somewhat heat the oil by churning it through the gears of the pump, and further because of having this supply of oil within the basement of the home at all times, plug 25' is removed from the port 25 and the ports 20 and 62 are plugged.

Fig. 10 shows the valves equipped with bellows diaphragms 93 in place of the pistons 69 and 72. There is no casing change here of any kind except that the upper part of the sleeves have been drilled to provide shoulders 94 and the threads 76 have been extended to receive lock nuts 95 which secures the flanges 96 of the diaphragms in position.

Fig. 3 shows the rib 38 cored out to provide passageway 41 for the supply of liquid to the pump, but when the pump is of the type which rotates in the opposite direction, the other rib 39 will be cored out to provide the passageway 41a which will function exactly as the passageway 41.

It will be seen that both lugs 18 and 19 are provided with bores 26 and 27 and with seats 23 and 24 so that either valve sleeve 13 or 14 may be utilized for the by-pass valve and equipped when desired with the ball 88 and spring 87 for checking the by-pass of liquid to the vacuum chamber or, conversely, these elements may be omitted and the outlets 61 or 62 plugged as shown in Fig. 8 when it is desired to by-pass the excess liquid to the vacuum chamber.

With the construction here illustrated, one pattern need only be made to take care of the several conditions required for devices of this type. It is true that in some instances the rib 38 will be cored out, while in other instances the rib 39 will be cored out, but the device itself may have the inlet on either side desired. The valve sleeves 13 and 14 with their passageways being identical, the operating parts of these valves may be interchanged at will, care, however, being taken to properly adjust the screws 79 to provide the required tension on the springs 82 and 83.

With this type of valve the by-pass valve may normally remain seated and the maximum liquid flow through the passages 61' and 61 may be equal to the pump volume less the normal skid around the pistons 69 and 72.

It will also be seen that the device is interchangeably arranged for the by-passing of excess liquid either to the source of supply or to the vacuum chamber.

It will also be apparent that liquid pressure can never be built up on the upper side of either of the pistons, first, because the upper side of the piston of the regulating valve always communicates with the vacuum chamber, and second, because (a) when the ball 86 and spring 87 are employed the upper side of the piston of the by-pass valve communicates with the supply tank which is at atmospheric pressure, and (b) when the plug 88 is used and the said ball and spring omitted, the upper side of the piston of said valve will communicate with the vacuum chamber.

Of course, the liquid pressure control unit herein illustrated may be modified and changed in various ways without departing from the invention herein set forth and hereafter claimed.

The invention is hereby claimed as follows:

1. A liquid pressure control unit comprising a unitary casing with valve housings on opposite sides of a vacuum chamber, an inlet for communication with a source of liquid fuel supply and said vacuum chamber, a pressure pump located in said casing between said valve housings and having its inlet connected to said chamber for creating a vacuum therein, a filter within the vacuum chamber and surrounding the head of said pump, a valve in one housing adapted to be opened at a predetermined liquid pressure to deliver liquid to the point of use, and a valve in the other housing adapted to be opened at a higher predetermined liquid pressure to discharge the excess volume of liquid, said valves each having a pressure chamber communicating by means of a passage in said casing with the pressure side of said pump.

2. A liquid pressure control unit comprising a unitary casing with valve housings on opposite sides of a vacuum chamber, an inlet for communication with a source of liquid fuel supply and said vacuum chamber, a pressure pump located in said casing between said valve housings and having its inlet connected to said chamber for creating a vacum therein, a filter within the vacuum chamber and surrounding the head of said pump, a valve in one housing adapted to be opened at a predetermined liquid pressure to deliver liquid to the point of use, a valve in the other housing adapted to be opened at a higher predetermined liquid pressure to discharge the excess volume of liquid, said valves each having a pressure chamber communicating by means of a passage in said casing with the pressure side of said pump, passages from both valve housings to the vacuum chamber, and means for closing either of said last passages.

3. A liquid pressure control unit comprising a unitary casing with valve housings on opposite sides of a vacuum chamber, an inlet for communication with a source of liquid fuel supply and said vacuum chamber, a pressure pump located in said casing between said valve housings and having its inlet connected to said chamber for creating a vacuum therein, a filter within the vacuum chamber and surrounding the head of said pump, a valve in one housing adapted to be opened at a predetermined liquid pressure to deliver liquid to the point of use, and a valve in the other housing adapted to be opened at a higher predetermined liquid pressure to discharge the excess volume of liquid, said valves each having a pressure chamber communicating by means of a passage in said casing with the pressure side of said pump, said valves being so designed that the operating parts of same are interchangeable.

4. A liquid pressure control unit having a casing provided with a vacuum chamber, an inlet through which liquid may be passed from a source of liquid supply to said chamber, a pressure pump in said casing having its inlet connected to said chamber, a pressure regulating valve and an excess by-pass valve in said casing, a passageway in said casing from the pressure side of the pump communicating with a pressure inlet in each valve, spring tensioned means above the pressure inlet in each valve, the means in said first valve having a needle normally closing a delivery opening and having means for raising same from said opening when a predetermined pressure is attained, the means in said second valve having a needle normally closing a passage leading to the source of supply and adapted to be raised when a higher predetermined pressure is attained, a passage extending from the needle apex through the second means, a passageway leading from a point above said means to the vacuum chamber, and means for closing said passage to the source of supply to bypass excess liquid to the vacuum chamber.

5. A liquid pressure control unit having a casing provided with a vacuum chamber, an inlet through which liquid may be passed from a source of liquid supply to said chamber, a pressure pump in said casing having its inlet connected to said chamber, a filter within the vacuum chamber and surrounding a part of the head of said pump, a pressure regulating valve and an excess bypass valve in said casing, said valves being on opposite sides of said casing, a passageway in said casing from the pressure side of the pump communicating with a pressure inlet in each valve, spring tensioned means above the pressure inlet in each valve, the means in said first valve having a needle normally closing a delivery opening and having means for raising same from said opening when a predetermined pressure is attained, the means in said second valve having a needle normally closing a passage leading to the source of supply and adapted to be raised when a higher predetermined pressure is attained, a passage extending from the needle apex through the second means, a passageway leading from a point above said means to the vacuum chamber, and means for closing said passage to the source of supply to bypass excess liquid to the vacuum chamber.

6. A liquid pressure control unit having a casing provided with a vacuum chamber, an inlet through which liquid may be passed from a source of liquid supply to said chamber, a pressure pump in said casing having its inlet connected to said chamber, a pressure regulating valve and an excess bypass valve in said casing, a passageway in said casing from the pressure side of the pump communicating with a pressure inlet in each valve, spring tensioned means above the pressure inlet in each valve, the means in said first valve having a needle normally closing a delivery opening and having means for raising same from said opening when a predetermined pressure is attained, the means in said second valve having a needle normally closing a passage leading to the source of supply and adapted to be raised when a higher predetermined pressure is attained, a passage extending from the needle apex through the second means, a passageway leading from a point above said means to the vacuum chamber, and removable means for closing said last passageway when it is desired to by-pass the excess liquid to the source of supply.

7. A liquid pressure control unit having a casing provided with a vacuum chamber, an inlet through which liquid may be passed from a source of liquid supply to said chamber, a pressure pump in said casing having its inlet connected to said chamber, a filter in the vacuum chamber and surrounding a part of the head of said pump, a pressure regulating valve and an excess by-pass valve in said casing, said valves being on opposite sides of said casing, a passageway in said casing from the pressure side of the pump communicating with a pressure inlet in each valve, spring tensioned means above the pressure inlet in each valve, the means in said first valve having a needle normally closing a delivery opening and having means for raising same from said opening when a predetermined pressure is attained, the means in said second valve having a needle normally closing a passage leading to the source of supply and adapted to be raised when a higher predetermined pressure is attained, a passage extending from the needle apex through the second means, a passageway leading from a point above said means to the vacuum chamber, and removable means for closing said last passageway when it is desired to by-pass the excess liquid to the source of supply.

8. A liquid pressure control unit having a casing provided with a vacuum chamber, an inlet through which liquid may be passed from a source of liquid supply to said chamber, a pressure pump in said casing having its inlet connected to said chamber, a filter in the vacuum chamber and surrounding a part of the head of said pump, a pressure regulating valve and an excess by-pass valve in said casing, a passageway in said casing from the pressure side of the pump communicating with a pressure inlet in each valve, spring tensioned means above the pressure inlet in each valve, the means in said first valve having a needle normally closing a delivery opening and having means for raising same from said opening when a predetermined pressure is attained, the means in said second valve having a needle normally closing a passage leading to the source of supply and adapted to be raised when a higher predetermined pressure is attained, a passage extending from the needle apex through the second means, a passageway leading from a point above said means to the vacuum chamber, and a plug in the passageway leading to the source of supply when it is desired to by-pass the excess liquid to the vacuum chamber.

9. A liquid pressure control unit having a casing provided with a vacuum chamber, an inlet through which liquid may be passed from a source of liquid supply to said chamber, a pressure pump in said casing having its inlet connected to said chamber, a filter in the vacuum chamber and surrounding a part of the head of said pump, a pressure regulating valve and an excess by-pass valve in said casing, said valves being on opposite sides of said casing, a passageway in said casing from the pressure side of the pump communicating with a pressure inlet in each valve, spring tensioned means above the pressure inlet in each valve, the means in said first valve having a needle normally closing a delivery opening and having means for raising same from said opening when a predetermined pressure is attained, the means in said second valve having a needle normally closing a passage leading to the source of supply and adapted to be raised when a higher predetermined pressure is attained, a passage extending from the needle apex through the second means, a passageway leading from a point above said means to the vacuum chamber, and a plug in the passageway leading to the source of supply when it is desired to by-pass the excess liquid to the vacuum chamber.

THOMAS W. MURPHY.